United States Patent [19]

Plows et al.

[11] 3,981,018

[45] Sept. 14, 1976

[54] THERMOPLASTIC RECORDER WITH A HEATING SUPPORT

[75] Inventors: Graham Stuart Plows; Pauline Margaret Toms, both of London, England

[73] Assignee: Decca Limited, London, England

[22] Filed: Oct. 17, 1974

[21] Appl. No.: 515,558

[52] U.S. Cl. ...................... 346/74 TP; 178/6.6 TP; 219/216
[51] Int. Cl.² ........................................ G03G 16/00
[58] Field of Search .................. 346/74 TP, 74 ES; 340/173 TP; 219/243, 275, 216; 178/6.6 TP

[56] References Cited
UNITED STATES PATENTS

| 3,005,402 | 10/1961 | Starger | 219/243 |
| 3,121,216 | 2/1964 | Wolfe | 346/74 TP |
| 3,283,309 | 11/1966 | Gaynor | 346/74 TP |

FOREIGN PATENTS OR APPLICATIONS

| 693,036 | 12/1958 | Canada | 346/73 TP |

Primary Examiner—Bernard Konick
Assistant Examiner—Jay P. Lucas
Attorney, Agent, or Firm—Edward F. Connors

[57] ABSTRACT

A method of recording information on a thin film of thermoplastics material over a generally circular recording area, comprises the steps of directing a focussed, modulated beam of electrons on the film and simultaneously moving the film so that the beam deposits a track of charge which follows a spiral path, the film being carried by a support which has a conductive part in contact with the film, wherein the film is heated by the passage of an electric current through the conductive part of the support, the current being circumferentially uniform over the recording area. Preferably the information is recorded over an annular recording area between two spaced concentric conductive annular members in contact with the conductive part of the support, between which members the current is passed.

A support for use with the method may comprise a conductive plate of which the local resistance per unit surface area at any point within a substantial part of the plate is proportional to the square of the radius of that point from the center of the plate.

2 Claims, 3 Drawing Figures

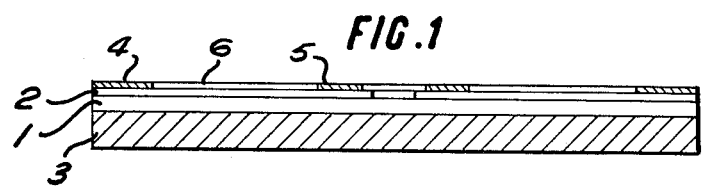
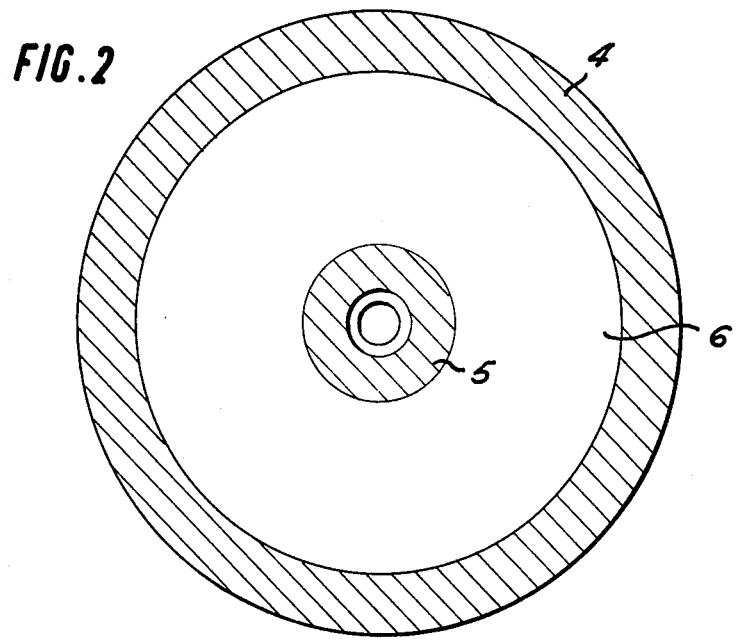
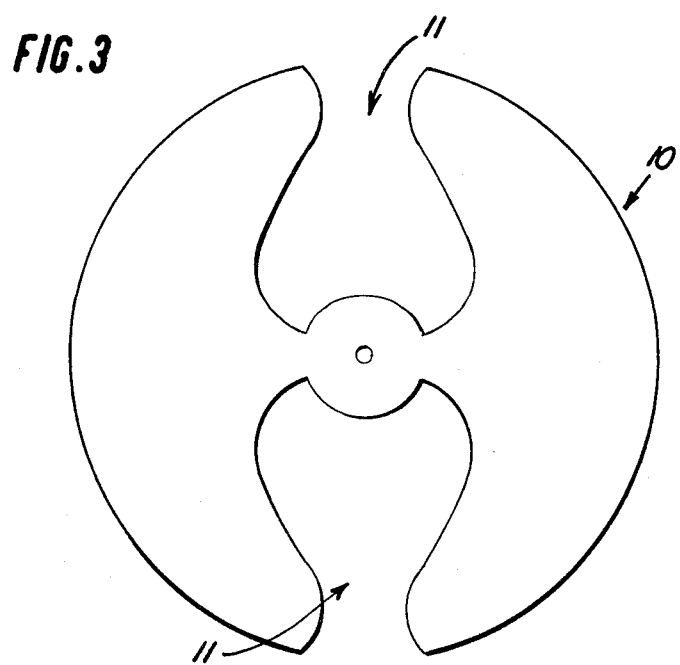

3,981,018

THERMOPLASTIC RECORDER WITH A HEATING SUPPORT

FIELD OF THE INVENTION

This invention relates to the recording of signals, particularly but not exclusively television signals, on thin films of thermoplastics material.

BACKGROUND OF THE INVENTION

In particular, the invention is intended for use in a method of recording in which a thin film of thermoplastic material is carried on a conductive support, a track of electric charge is laid down on the film by means of a scanning electron beam modulated in accord with an input signal, the film is heated either before or after the track is deposited and is subsequently cooled or allowed to cool to preserve variations in a contour of a groove formed along the line of the track. The track is preferably a spiral track in order to provide conveniently a substantial playing time of a recording. However the present invention is applicable generally where an approximately circular area is scanned and thereby carries a recording.

The mechanism by which signals are recorded by this method is as follows: if the material is softened the electrostatic attraction between the deposited charge and the conductive support produces physical contours corresponding to the input signal; subsequent cooling of the thermoplastic material makes possible the preservation of the contour recording despite the eventual dissipation of the deposited charge.

The present invention is particularly concerned with the heating of the film. It is desirable that all the conditions which affect the deformation of the film are kept constant over the recorded area, and therefore that the film should reach a uniform temperature so that it responds in a uniform manner over the recorded area to the electrostatic pressure exerted by the deposited charge.

The term "thermoplastics" is not used herein in a strict sense to connote any specific group of chemical compounds; a variety of substances, including waxes, would be suitable. One thermoplastics material that would be particularly suitable is polystyrene which can be sprayed, painted or spun onto the conductive disc and, if necessary, partially scraped off to leave a film of the desired thickness.

SUMMARY OF THE INVENTION

According to the present invention, there is provided a method of recording on a thin film of thermoplastics material over a generally circular recording area, comprising directing a focussed, modulated beam of electrons at the film and simultaneously moving the film so that the beam deposits a track of charge which follows a spiral path, the film being carried by a support which has a conductive part in contact with the film, wherein the film is heated by the passage of an electric current through the conductive part of the support, the current being circumferentially uniform over the recording area.

Preferably the information is recorded over an annular recording area between two spaced concentric conductive annular members in contact with the conductive part of the support, between which members the current is passed.

According to another aspect of the present invention, there is provided a support for use with the method hereinbefore described comprising a conductive plate of which the local resistance per unit surface area at any point within a substantial part of the plate is proportional to the square of the radius of that point from the centre of the plate.

Preferably two spaced concentric conductive annular members are provided, one centrally and the other peripherally, on the plate.

Preferably the thickness of the conductive part of the support at any point in the recording area is inversely proportional to the square of the radius of that point from the centre of the recording area.

BRIEF DESCRIPTION OF THE DRAWINGS

FIG. 1 is a diagrammatic cross-sectional view of a support carrying a thermoplastics film;

FIG. 2 is a plan view of the arrangement of FIG. 1; and

FIG. 3 is a diagrammatic view of a rotatable mask for use in making the support shown in FIG. 1.

DESCRIPTION OF THE PREFERRED EMBODIMENT OF THE INVENTION

Referring to FIGS. 1 and 2, a support includes an insulating disc 1 which is preferably of plate glass about 1 inch thick, which carries a conductive film or layer 2 of chromium of variable thickness. The average thickness of the layer 2 is of the order of 0.25 microns. The disc 1 which provides rigidity to the layer 2 is mounted on a base member 3.

Two spaced concentric gold rings 4 and 5 which are at least 2 microns thick are provided on the chromium layer by vacuum deposition, for example. These rings afford a low resistance path on each edge of the layer 2 and can be used as electrical contacts for the passing of a current between them through the chromium layer, as hereinafter described.

A thin film 6 of thermoplastics material is then prepared on the chromium layer in the annular space between the two rings 4 and 5, which define the inner and outer boundaries of the area of the film which can be used to record signals. The thickness of the film 6 is preferably in the range of 1 to 10 microns.

In a particular embodiment of the invention, a 2.5 micron thick film 6 of the thermoplastics resin "staybellite" is prepared from a solution of iso-octane, the film being allowed to retain about 5% by weight of solvent. A spiral charge strip of approximately 3 microns width, having a pitch of 7.1 microns and an average charge density of 0.007 coulombs per square metre is laid down on the film by the electron beam recording process described in the above mentioned patent application.

Electrical contact is made to the two rings 4 and 5 by four carbon fibre brushes using a pneumatic pressure of 40 lbs/sq in to ensure good contact. Any other type of contact at any number of points or annular contacts of corresponding diameters would also be suitable, but preferably the brushes used are constructed so that they are easily deformable by the pressure applied to them against the rings 4 and 5, or they are of a material which is mechanically softer than that of the rings 4 and 5.

The film 6 is then heated by the passage of a brief, relatively high current pulse through the chromium layer either from the inner ring 5 to the outer ring 4 or vice versa. In the particular embodiment described, the magnitude of the current pulse is such that the energy dissipation over the recording area is a uniform 0.75 joules/sq.cm in 100 milliseconds. This particular method can produce deformations of the order of 0.5 microns in depth in the film of "Staybellite" material.

The amount of energy dissipated by the chromium layer 2 at each point in the recording area is determined by the local resistance per unit area of the layer at that point, and the local resistance per unit area can be assumed to be inversely proportional to the thickness of the layer at that point.

For an annulus of radius $r$ from the notional centre of the recording area, radial thickness $\delta r$, and local thickness $t$, the power dissipated per unit surface area of the annulus can be shown to be inversely proportional to the procuct ($r^2 t$). Therefore, if the amount of power dissipated over the recording area is to be uniform, as in the preferred embodiment, where all the other recording parameters, such as charge density for example are uniform also, the thickness of the layer at any one point must be inversely proportional to the square of the radial distance of that point from the notional centre of the recording area. However, if radial variations occur in the other recording parameters, uniform recording response i.e. deformations of equal depth, can still be achieved over the recording area by corresponding radial variation in the chromium layer thickness and hence the energy dissipated.

A conductive layer of variable thickness can be made either by vacuum deposition of a suitable conductive material such as chromium on one of the broad faces of the insulating disc, using a masking iris which is closed or almost closed at the start of the deposition and gradually opens at a rate related to the rate of evaporation to achieve the desired variation in the layer thickness. Alternatively, it can be produced by the rotation of a mask 10 (shown in FIG. 3) between the evaporation source and the insulating disc during evaporation, the mask having cut-out portions 11 the shape of which are calculated so as to control the time of exposure of each part of the insulating disc to the source during evaporation.

We claim:

1. A method of recording information on a thin film of thermoplastics material over a substantially circular recording area which comprises the steps of placing the film on a support which includes a conductive plate, said conductive plate having a thickness which, at least within a substantially circular region of the plate, decreases with increasing radius from the center of said region of the plate, the local resistance per unit area of the plate at any point within said region of the plate being proportional to the square of the radius of that point from the center of said region and the thickness of the conductive plate at any point in the substantially circular region being inversely proportional to the square of the radius of that point from the center of the region with said region of the plate being in contact with the film; directing a focussed, modulated beam of electrons on to the film; simultaneously moving the film so that the beam deposits a track of electric charge which follows a spiral path, and heating the film by passing an electric current radially through the conductive plate of the support, the current being circumferentially uniform so that the heat generated per unit area by the passage of the current through the conductive plate is uniform.

2. A method as claimed in claim 1, in which the current is passed between two spaced concentric conductive annular members in electrical contact with the conductive plate of the support, the members constituting the boundaries of an annular recording area of the film.

* * * * *